United States Patent [19]

Ogata et al.

[11] 4,452,407
[45] Jun. 5, 1984

[54] TAPE CASSETTE HAVING A REEL BRAKING MECHANISM

[75] Inventors: Haruki Ogata, Sagamihara; Kimio Ogawa; Hiroyuki Umeda, both of Yokohama, all of Japan

[73] Assignee: Victor Company of Japan, Ltd., Yokohama, Japan

[21] Appl. No.: 380,819

[22] Filed: May 21, 1982

[30] Foreign Application Priority Data

May 29, 1981 [JP]  Japan ............................. 56-77638[U]
Jun. 30, 1981 [JP]  Japan ............................. 56-97117[U]

[51] Int. Cl.³ .................... G11B 15/32; G11B 23/04
[52] U.S. Cl. .................................. 242/198; 242/199; 360/132
[58] Field of Search ............... 242/197, 198, 199, 200, 242/75.4, 156, 156.1, 204; 360/93, 94, 95, 96.3, 96.5, 132

[56] References Cited

U.S. PATENT DOCUMENTS

| | | | |
|---|---|---|---|
| 3,900,171 | 8/1975 | Serizawa | 242/198 |
| 3,913,145 | 10/1975 | Wiig | 242/198 X |
| 3,941,333 | 3/1976 | Carpenter et al. | 242/197 |
| 3,950,785 | 4/1976 | Findley | 242/197 X |
| 3,987,980 | 10/1976 | Sperry | 242/199 |
| 4,183,477 | 1/1980 | Iwase et al. | 242/198 |
| 4,232,840 | 11/1980 | Sugawara | 242/198 |
| 4,341,365 | 7/1982 | Oishi | 242/199 |

FOREIGN PATENT DOCUMENTS 4635029  3/1968  Japan .............................. 242/199

OTHER PUBLICATIONS

W. G. Jackson and D. H. Johnson, "Tape Cassette", IBM Technical Disclosure Bulletin, vol. 14, No. 8, Jan. 1982.

Primary Examiner—Stuart S. Levy
Assistant Examiner—Scott J. Haugland
Attorney, Agent, or Firm—Louis Bernat

[57] ABSTRACT

A tape cassette is loaded with respect to a recording and/or reproducing apparatus having a reel driving mechanism including at least one reel driving shaft. The tape cassette comprises a cassette case, reels provided within the cassette case, for winding a tape, and a reel braking mechanism for preventing unnecessary rotation of the reel when the tape cassette is not used, and releasing the braking when the reel driving shaft is inserted into the reel. The reel braking mechanism comprises a first teeth part having crests and valleys, formed on the lower surface of the reel, a second teeth part having crests and valleys, formed on a bottom plate of the cassette case at a position opposing the first teeth part of the reel, and a spring for urging the reel towards the bottom plate of the cassette case so that the first and second teeth parts mesh with each other. The crests of at least one of the first and second teeth parts the formed with a tapered surface on at least one side thereof.

10 Claims, 29 Drawing Figures

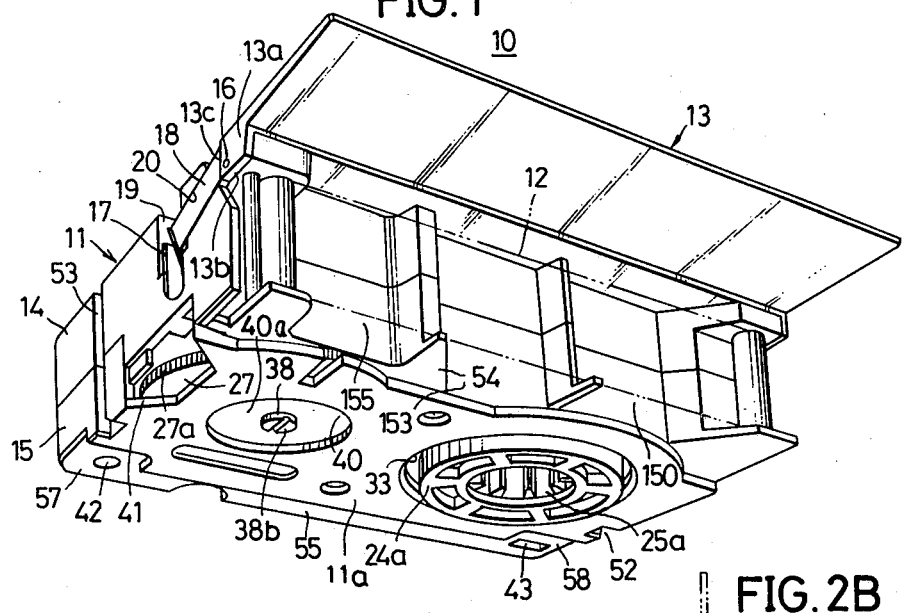
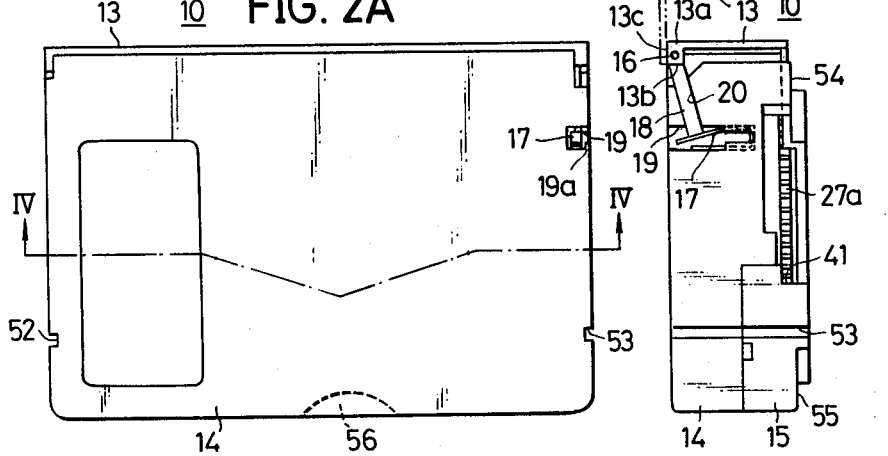

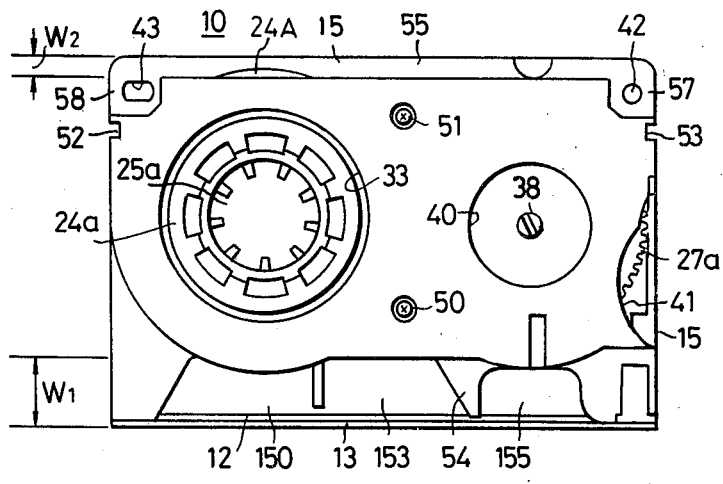
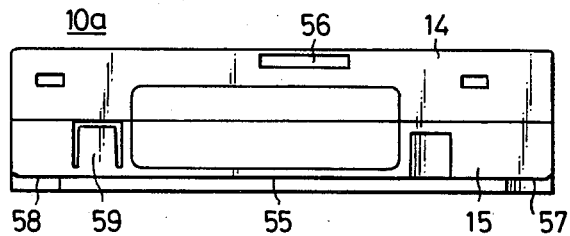
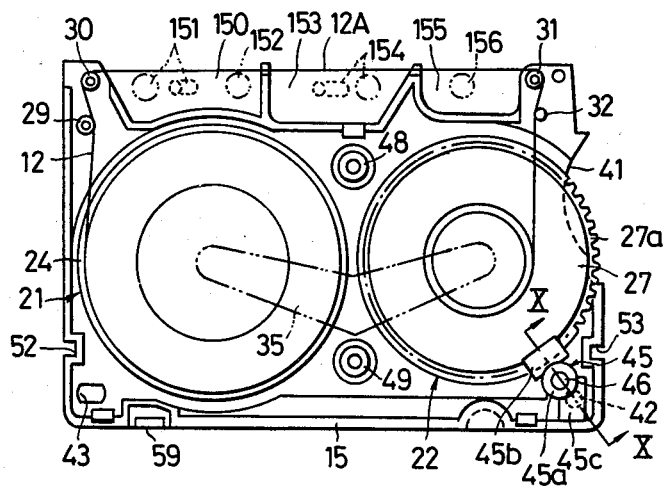

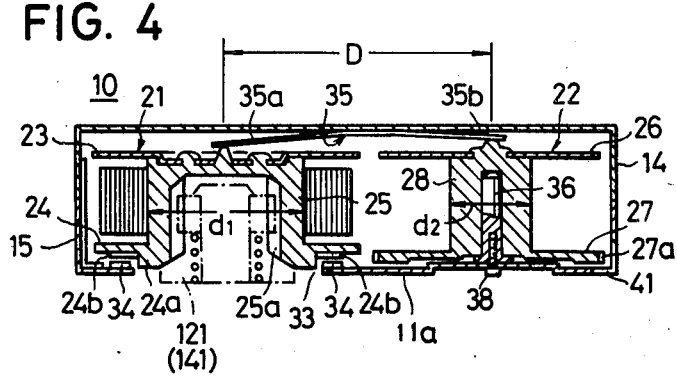
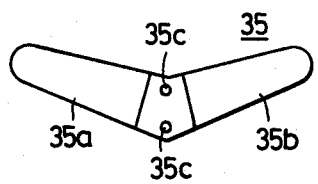
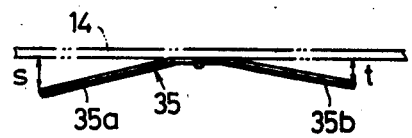
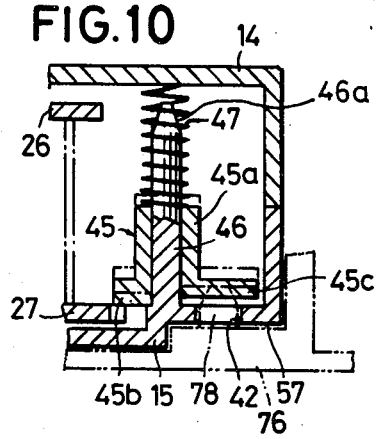

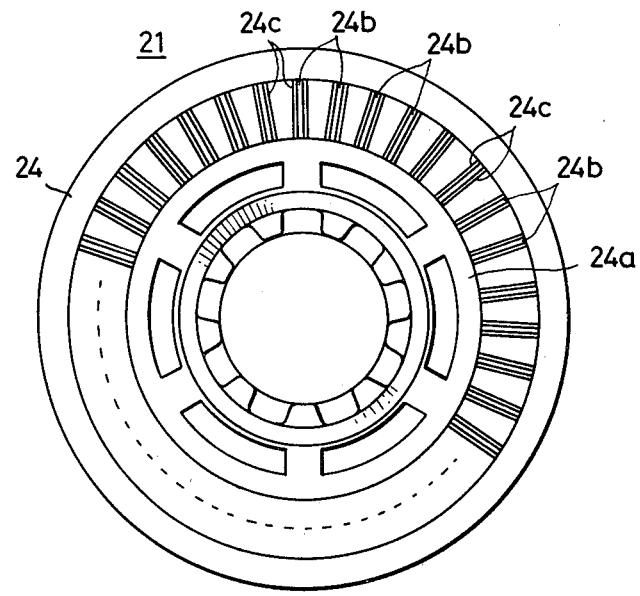
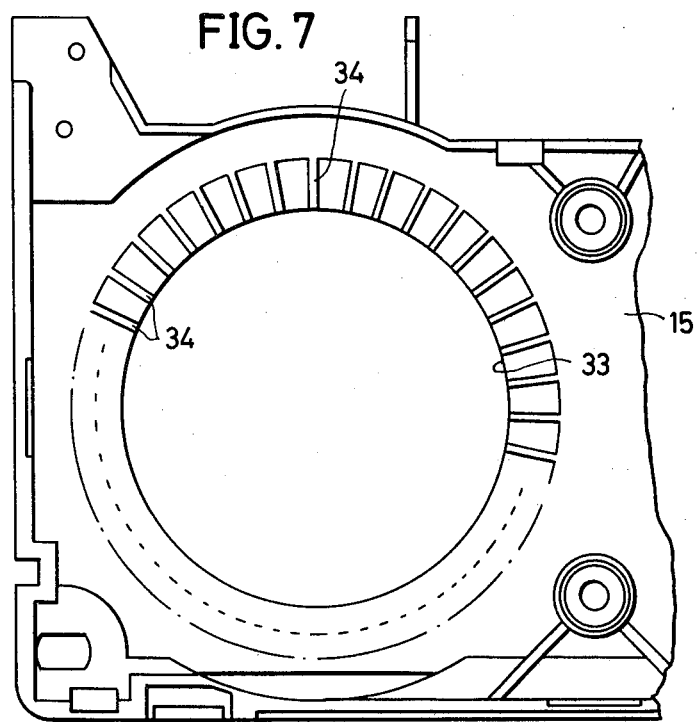

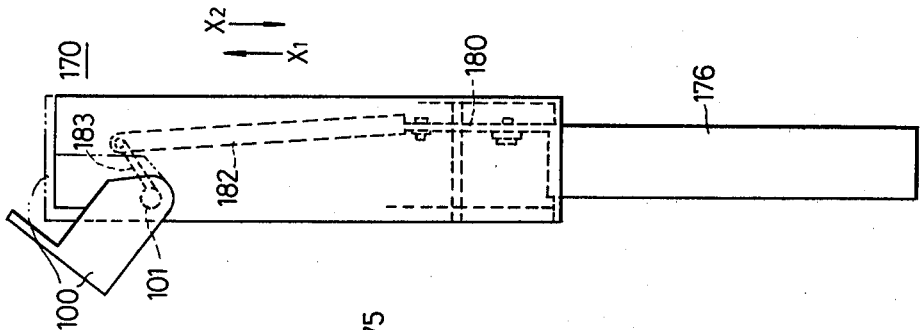
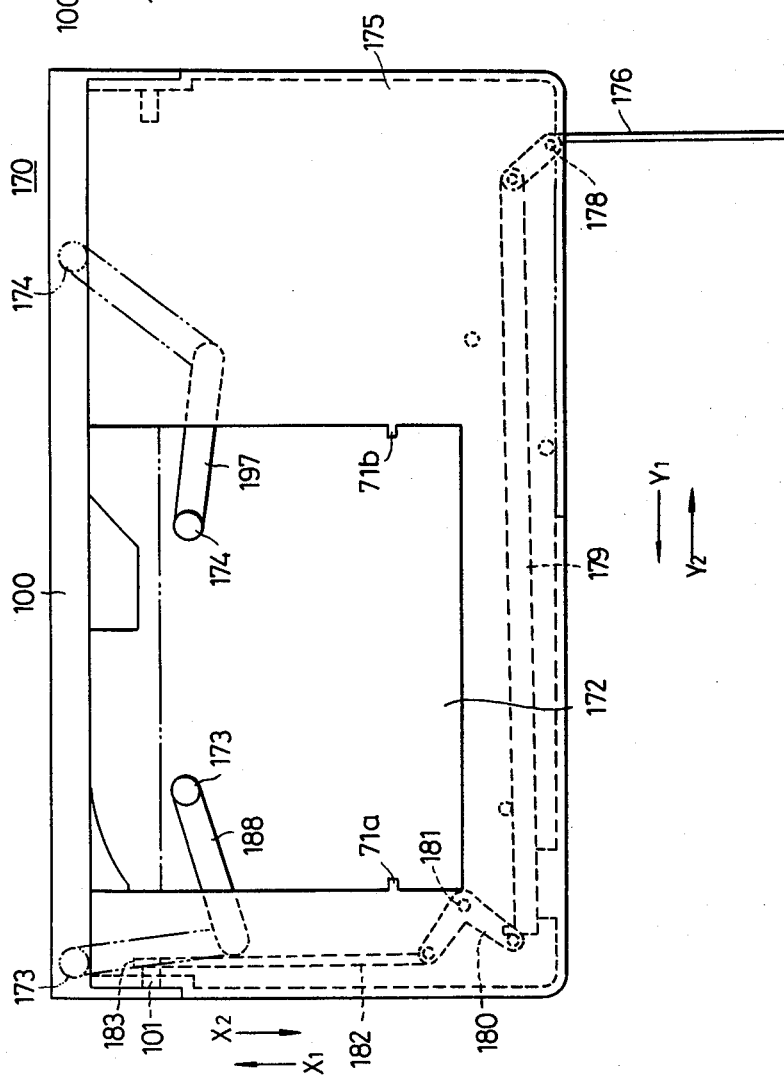

TAPE CASSETTE HAVING A REEL BRAKING MECHANISM

BACKGROUND OF THE INVENTION

The present invention generally relates to tape cassettes having reel braking mechanisms, and more particularly to a tape cassette having a reel braking mechanism constructed so that in a state where the tape cassette is loaded into a recording and/or reproducing apparatus, braking against a reel is released, and in a state where the tape cassette is not loaded into the recording and/or reproducing apparatus, the unnecessary rotation of the reel is prevented by the braking operation, nevertheless the reel is rotated to pay the tape out in a case where the magnetic tape is applied with a force to be drawn out from a cassette case.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in reducing the size of the recording and/or reproducing apparatus main body. This is to realize a more compact portable type recording and/or reproducing apparatus, and, for example, to realize such an equipment that a recording apparatus is unitarily built into a television camera.

In this regard, some attempts have been made to realize a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, the above compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply reel and a take-up reel is set equal to the distance between the supply and take-up reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply and take-up reels. In this system, as a modification of the standard type recording and/or reproducing apparatus, the recording and/or reproducing apparatus can be constructed so that a reel disc for driving the take-up reel is movable. In this modification of the standard type recording and/or reproducing apparatus, the take-up reel disc is at a normal position when loaded with the standard type tape cassette, and the take-up reel disc is moved to a position closer to the supply reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette. Practically, the realization of such a mechanism is virtually impossible.

Accordingly, in a U.S. patent application Ser. No. 322,174 filed on Nov. 17, 1981 entitled "TAPE CASSETTE", in which the assignee is the same as that of the present application, a novel and useful tape cassette which has overcome the above described disadvantages was proposed, and this novel tape cassette is now being realized.

In the above previously proposed tape cassette, a braking mechanism is provided to prevent unnecessary rotation of the reels. This mechanism is provided so that the supply reel and the take-up reel within the cassette case do not rotate unnecessarily when the tape cassette is not used. Accordingly, slack is prevented from being introduced in the tape, and the tape is prevented from being excessively exposed outside the cassette case. To be more concrete, a braking mechanism is provided with respect to the take-up reel so that when the tape cassette is not used, braking is performed with respect to the peripheral edge of a reel flange so that the take-up reel does not rotate, and when the tape cassette is loaded into a tape cassette adapter or a recording and/or reproducing apparatus, the above braking is released. In addition, with respect to the supply reel, a braking mechanism is provided wherein teeth are provided in a ring shape on the lower surface of a reel flange, teeth are provided in a ring shape on a bottom plate of the cassette case at positions corresponding to the teeth formed on the lower surface of the reel flange, and a spring is provided to urge the supply reel downwards. In the braking mechanism provided with respect to the supply reel, the teeth of the reel flange of the supply reel which is urged downwards, mesh with the teeth provided on the bottom plate of the cassette case, to prevent unnecessary rotation of the reel. When the tape cassette is loaded into the recording and/or reproducing apparatus directly, or in a state accommodated within the adapter, a reel driving shaft of the apparatus enters into a center hole of the supply reel to lift up the supply reel. Hence, in this case, the above teeth are disengaged from the meshed state, and the braking with respect to the supply reel is released.

In the above teeth formed on the reel flange and formed on the bottom plate of the cassette case, the convex part and the concave part of the tooth have a rectangular shape. Thus, in a state where the tape cassette is not loaded into the recording and/or reproducing apparatus, the crest part and the valley part of both teeth perfectly mesh, permitting almost no rotation of the supply reel. Therefore, when the tape cassette is not used, the supply reel is essentially prevented from rotating unnecessarily.

On the other hand, when the tape cassette is accommodated within the adapter, it is necessary to draw a portion of the tape out of the cassette case, to form a predetermined tape path within the adapter. In this case, the operator inserts a finger of his one hand from the lower part of the cassette case to lift the supply reel and release the engagement of the teeth. But while maintaining this state, the operator must draw the tape outside the cassette case with fingers of his other hand. The tape cassette is thus loaded into a predetermined position within the adapter, while the tape thus drawn out is guided along the predetermined tape path within the adapter. However, in this case, there was a disadvantage in that the operation to lift the above supply reel with the finger to release the engagement between the teeth and release the braking operation, was troublesome to perform.

Furthermore, an adapter has been proposed having a construction such that the tape cassette is loaded as it is into the adapter, and a lever provided in the adapter is angularly rotated to draw the tape outside the cassette case and guide the tape along the predetermined tape path within the adapter. When the tape cassette is loaded into the adapter, a pin provided on the adapter relatively enters within the cassette case, to release the braking against the take-up reel. Accordingly, although the braking against the supply reel maintained when the lever in the above adapter is angularly rotated, the tape can be drawn out from the take-up reel to be guided along the predetermined tape path since the take-up reel is released of the braking and can rotate. However, in a case where all the tape is wound onto the supply reel of the tape cassette which is loaded into the adapter, and there is no tape or leader tape wound around the take-up reel to allow the tape to be drawn out from the take-up reel, a problem is introduced. That is, an excess force is applied to the tape when the lever in the adapter is angularly rotated. In extreme cases, the tape will be broken because of this excessive force applied to the tape.

SUMMARY OF THE INVENTION

Accordingly, it is a general object of the present invention to provide a novel and useful tape cassette having a reel braking mechanism, in which the above described disadvantages have been overcome.

Another and more specific object of the present invention is to provide a tape cassette having a reel braking mechanism constructed so that braking is applied to a certain extent so that a reel is prevented from rotating unnecessarily when the tape cassette is not used, and when a force is applied to a tape to draw the tape outside a cassette case, the reel can rotate according to the force applied to draw out the tape. In the reel braking mechanism in the tape cassette according to the present invention, a sloping surface is provided on each tooth for at least the teeth provided on the lower surface of a reel flange or the teeth provided on a bottom plate of the cassette case which mesh with the above teeth. Due to this construction, it becomes unnecessary to perform an operation to lift the reel to release the braking when the tape is drawn outside the cassette case.

Still another object of the present invention is to provide a tape cassette having a reel braking mechanism, constructed so that braking with respect to a reel is released to some extent when the tape cassette is loaded into the adapter. According to the tape cassette of the present invention, when the tape is drawn outside the cassette case in a state where the tape cassette is loaded into the adapter, the tape can be drawn out from one reel with ease and smoothness even when the other reel has no more tape wound thereto to allow the tape to be drawn out from this other reel.

Other objects and further features of the present invention will be apparent from the following detailed description when read in conjunction with the accompanying drawings.

BRIEF DESCRIPTION OF THE DRAWINGS

FIG. 1. is a perspective view showing a tape cassette according to the present invention in a state where a tape protecting lid is open, viewed from a lower direction with respect to the front of the tape cassette;

FIGS. 2A, 2B, 2C, and 2D are diagrams respectively showing a plan view, a side view, a bottom view, and a rear view of the tape cassette shown in FIG. 1;

FIG. 3 is a plan view showing the inner construction of the tape cassette shown in FIG. 1 in a state where an upper half of a cassette case and an upper flange of a reel are removed;

FIG. 4 is a diagram showing a cross section along a line IV—IV in FIG. 2A;

FIGS. 5A and 5B are diagrams respectively showing a plan view and a front view of an embodiment of a leaf spring for pushing against a reel;

FIG. 6 is a view showing a bottom surface of a supply reel flange which is a constituting element of an embodiment of a reel braking mechanism in a tape cassette according to the present invention;

FIG. 7 is a plan view showing an essential part of a bottom plate of a cassette case which constructs a reel braking mechanism together with the bottom surface of the supply reel flange shown in FIG. 6;

FIG. 10 is an elevation, partly in cross section, showing a brake mechanism with respect to a take-up reel along a line X—X in FIG. 3;

FIGS. 17 and 18 are diagrams respectively showing a plan view and a side view of a tape cassette adapter in a state where a rear lid is open in FIG. 16;

DETAILED DESCRIPTION

Figure 8:
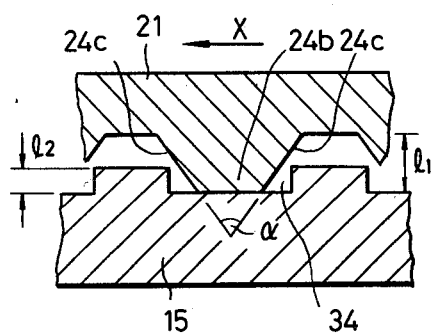
FIG. 8 is a view in cross section showing a reel braking mechanism part.

A miniature type tape cassette 10 according to the present invention has a configuration shown in FIGS. 1, 2A through 2D, 3, and 4. The tape cassette 10 has a cassette case 11 of a size smaller than a standard type tape cassette which is loaded into a standard type recording and/or reproducing apparatus. A lid 13 for protecting a magnetic tape 12 accommodated within the tape cassette 10, is provided on the front of the cassette case 11. The cassette 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14. The slide rod 18 is provided within a groove 20 at the side of the upper half 14, in a freely slidable manner. Moreover, when the tape cassette 10 is not loaded into a recording and/or reproducing apparatus designed exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

In addition, as shown in FIGS. 3 and 4, a supply side reel (supply reel) 21 and a take-up side reel (take-up reel) 22 are provided side by side within the cassette case 11. A distance D between centers of the reels 21 and 22 is shorter than the distance between centers of supply and take-up reels of a standard type tape cassette used with respect to a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front side of the cassette case 11, to form a tape path 12A reaching the take-up reel 22.

The supply reel 21 is provided in a state where an annular projecting step portion 24a of the lower flange 24 is loosely fitted into a hole 33 having a large diameter of the lower half 15. Moreover, teeth 24b are formed in a ring shape on the bottom surface of the lower flange 24 around the entire circular periphery thereof as shown in FIG. 6. Teeth 34 are formed in a ring shape on the upper surface of a bottom plate of the lower half 15, at positions opposing the above teeth 24b, as shown in FIG. 7. A braking mechanism with respect to the supply reel 21 is constructed by these teeth 24b and 34. The supply reel 21 is urged downwards to the lower half 15, by one arm portion 35a of a leaf spring 35 mounted on the lower surface of an upper plate of the upper half 14. Accordingly, in a normal state, crest parts and valley parts of the teeth 24b mesh with valley parts and crest parts of the teeth 34 as shown in FIG. 8. Hence, the supply reel 21 is braked and prevented from rotating unnecessarily when the tape cassette 10 is not used, due to the above meshing of the teeth 24b and 34. Thus, the supply reel 21 does not unnecessarily rotate while the tape cassette 10 is manipulated or in transit. Therefore, the magnetic tape 12 is prevented from being tangled and damaged, since slack is not introduced in the magnetic tape 12 which is wound around the supply reel 21, and the magnetic tape 12 is prevented from being pulled unnecessarily out from the supply reel 21.

Here, both side surfaces of the crest parts and the valley parts of the teeth 24b of the supply reel 21, are formed with tapered surfaces 24c sloping with an angle $\alpha$ with respect to each other, as shown in FIG. 8. In the present embodiment of the invention, a distance l1 along the height direction of the crest and valley parts of the teeth 24b, is set to a value larger than a distance l2 along the height direction of the crest and valley parts of the teeth 34. Concrete values for the above are, for example, $\alpha \approx 90°$, l1=1.5 mm, and l2=0.75 mm. As will be described hereinafter, when a force is applied to the tape 12 to draw the tape outside the cassette case 11 as the tape cassette 10 is loaded into a tape cassette adapter 60 shown in FIGS. 11 and 12, the supply reel 21 receives a force to rotate clockwise in FIG. 3 (direction of an arrow X in FIG. 8) due to tension in the tape 12. In this state, since the tapered surfaces 24c are formed on the teeth 24b as described above, the crest part of the teeth 24b easily rides over the crest part of the teeth 34. This means that the reel 21 can rotate. Accordingly, the tape 12 can be drawn outside the cassette case 11 without an excessive force being applied to the tape. Hence, the tape 12 is prevented from being damaged by stretching, breaking, and the like. Moreover, it is unnecessary to perform operations such as lifting the reel 21 by the operator's finger.

The meshing strength between the teeth 24b having the above tapered surfaces 24c and the teeth 34 is such that, the reel 21 will not rotate unnecessarily when the tape cassette 10 is not used even when shock and the like is applied upon transport, for example, and the crest part of the teeth 24b having the tapered surfaces 24c will ride over the crest part of the teeth 34 when a force is applied to the tape 12 to draw the tape out so that an excessive force is not applied to the tape and the reel 21 is allowed to rotate. The configurations of the teeth 24b and 34, and the urging force exerted by the leaf spring 35 are determined so as to obtain such meshing strength described above.

Figure 9A:
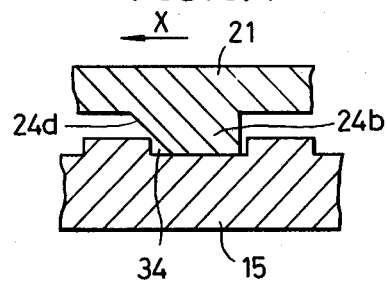
FIGS. 9A, 9B, 9C, and 9D are views in cross section respectively showing different modifications of the reel braking mechanism shown in FIG. 8.
Figure 9B:
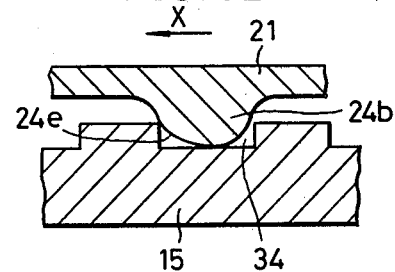
Figure 9C:
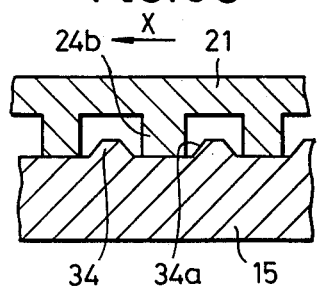
Figure 9D:
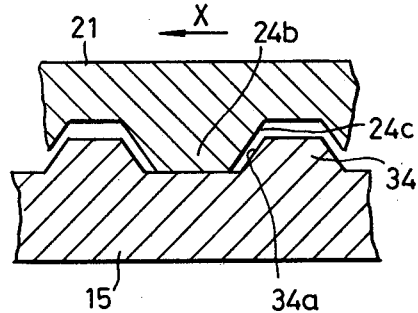

The configurations of the teeth 24b and 34 are not limited to those shown in FIG. 8. For example, these teeth 24b and 34 may have configurations shown in FIGS. 9A through 9D which show modifications of these teeth configurations. In FIG. 9A, the reel 21 rotates in the direction of the arrow X as the tape 12 is drawn out. In this modification, a sloping surface 24d is only formed on the leading side of the crest part of the teeth 24b which rides over the teeth 34 first. In FIG. 9B, instead of providing the tapered surface 24c on the teeth 24b, a smooth curved surface 24e is formed for the entire crest part of the teeth 24b. In addition, in the modification shown in FIG. 9C, the teeth 24b of the reel 21 have rectangular cross section as in the conventional reel, however, tapered surfaces 34a are formed on the teeth 34 of the lower half 15. Further, in FIG. 9D, the teeth 24b have tapered surfaces 24c, and the teeth 34 also have tapered surfaces 34a. In these modifications shown in FIGS. 9A through 9D, similar effects are obtained as those obtained in the above described embodiment of the invention.

A reel driving shaft inserting part 25a is provided inside the reel hub 25 of the supply reel 21, into which a reel driving shaft of the recording and/or reproducing apparatus is inserted. The inner diameter of the above reel hub 25 is equal to the inner diameter of a reel driving shaft inserting part of a supply reel in the standard type tape cassette.

The take-up reel 22 is provided in a rotatable manner such that a fixed shaft 36 fixed at the lower half 15 by a screw 38 is inserted into a center hole of the reel hub 28. The above take-up reel 22 is urged towards the lower half 15 by being pushed downwards by another arm portion 35b of the leaf spring 35. Since the reel hub 28 is not inserted with a reel driving shaft, an outer diameter d2 of the reel hub 28 is smaller than an outer diameter d1 of the reel hub 25 of the supply reel 21. Accordingly, the amount of magnetic tape 12 which can be accommodated within the tape cassette 10 becomes large as compared to the case where the outer diameters d1 and d2 of the reel hubs 25 and 28 are the same. Therefore, although the size of the tape cassette 10 is small, recording and reproduction can be performed for a relatively long period of time by use of the above tape cassette 10.

As shown in FIGS. 5A and 5B, the above leaf spring 35 is of a V-shape and is adhered and fixed in a state where a pair of holes 35c at the center thereof is fitted over projections at the lower surface of the upper plate of the upper half 14. The leaf spring 35 is shaped so that, in a free state, a bent amount s of the arm portion 35a which makes contact with the supply reel 21 is larger than a bent amount t of the other arm portion 35b which makes contact with the take-up reel 22. Hence, the resilient force exerted by the arm portion 35a is especially large. When the tape cassette 10 is not used, even if tapered surfaces are formed on the teeth 24b and/or the teeth 34, the supply reel 21 is pushed against the lower half 15 with a strong force, and the rotation of the supply reel 21 is positively prevented. On the other hand, when the tape cassette 10 is being used, the position of the supply reel 21 is positively secured by a supply reel driving shaft, to stabilize the magnetic tape travel.

In addition, gear teeth 27a are formed on the entire outer peripheral part of the lower flange 27 of the take-up reel 22. As shown in FIGS. 1, 2B, 2C, 3, and 4, a part of the outer peripheral part of the lower flange 27 is exposed through a cutout window 41 which extends from the side to the bottom of the lower half 15. The above cutout window 41 is of an arcuate shape on the bottom of the lower half 15.

Furthermore, with respect to the take-up reel 22, a braking mechanism shown in FIGS. 3 and 10 is provided. A braking member 45 consists of a brake shoe part 45b provided on one side of a cylindrical part 45a, and a rectangular engaging part 45c provided on the opposite side of the cylindrical part 45a. The above braking member 45 is provided in a state where the cylindrical part 45a is fitted over a projecting column 46 on the lower half 15, the brake shoe part 45b opposes an outer peripheral edge part at the upper surface of the reel flange 27, and the engaging part 45c is positioned at a corner part of the lower half 15. The braking member 45 is restricted of rotation, especially since the engaging part 45c is positioned at the corner part of the lower half 15. Moreover, the braking member 45 is urged towards the lower half 15 by a compressed coil spring 47 fitted over around the periphery of the projecting column 46, and the brake shoe part 45b presses against the outer peripheral edge part at the upper surface of the reel flange 27. Accordingly, in the state where the tape cassette 10 is not used, the take-up reel 22 is subjected to the braking action due to the force of friction introduced when the brake shoe part 45b presses against the outer peripheral edge part at the upper surface of the flange 27, and is stopped at this position. Thus, no slack is introduced in the magnetic tape 12 which is wound around the take-up reel 22. Furthermore, the engaging part 45c of the braking member 45 covers a positioning hole 42 formed in the lower half 15 which will be described hereinafter.

Since the take-up reel 22 is applied with the braking force only due to the force of friction introduced, the take-up reel 22 is capable of rotating when applied with a large rotational force. Accordingly, as will be described hereinafter, the magnetic tape 12 may be drawn out from the tape cassette 10 in a relatively easy manner, by rotating the take-up reel 22 towards a tape unwinding direction against the force exerted by the braking mechanism.

The braking mechanism may be assembled in a simple manner by successively fitting the braking member 45 and the coil spring 47 over the projecting column 46 after the take-up reel 22 is assembled into the lower half 15, and then, holding the vertex part of the coil spring 47 by covering the lower half 15 with the upper half 14.

A tip end part 46a of the projecting column 46 has a conical shape. This tip end part 46a does not pinch the coil spring 47 between the upper plate of the upper half 14. Thus, compared to the case where the spring 47 is pinched between the tip end of the projecting column and the upper half, the assembling of the upper half 14 and the lower half 15 is facilitated. The shape at the tip end part of the projecting column 46 is not limited to the above conical shape, and may be formed as other shapes such as semi-spherical shape.

The upper and lower halves 14 and 15 are fixed together by screws 50 and 51 in a state where the upper half 14 is positioned with respect to the lower half 15 by fitting projections 48 and 49 of the lower half 15 into corresponding depressions (not shown) of the upper half 14.

Grooves 52 and 53 extending in the direction of the height of the tape cassette, are respectively formed at positions closer to the rear side of the tape cassette, on the left and right sides of the tape cassette 10. These grooves 52 and 53 operate together with projecting rims of the tape cassette adapter as will be described hereinafter, and have functions to prevent the tape cassette from being loaded into the tape cassette adapter facing the wrong direction.

Moreover, a depressed step part 54 having a width W1 and a depressed step part 55 having a width W2 are respectively formed on the lid side and on the rear side at the bottom surface of the tape cassette 10. The widths of the depressed step parts 54 and 55 are different so as to satisfy a relation W1>W2. In addition, a substantially semi-circular depressed part 56 in the plan view, is formed at a central part in the upper surface of the tape cassette 10 facing the rear.

Figure 11:
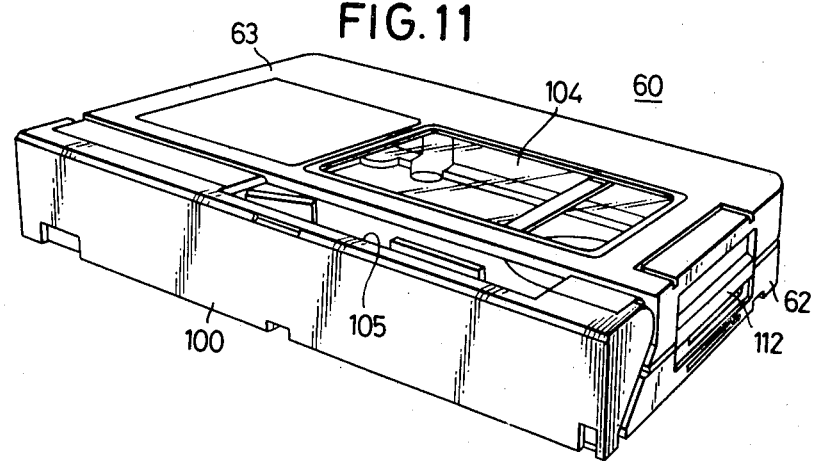
FIG. 11 is a perspective view showing an example of a tape cassette adapter into which the tape cassette shown in FIG. 1 is loaded.
Figure 13:
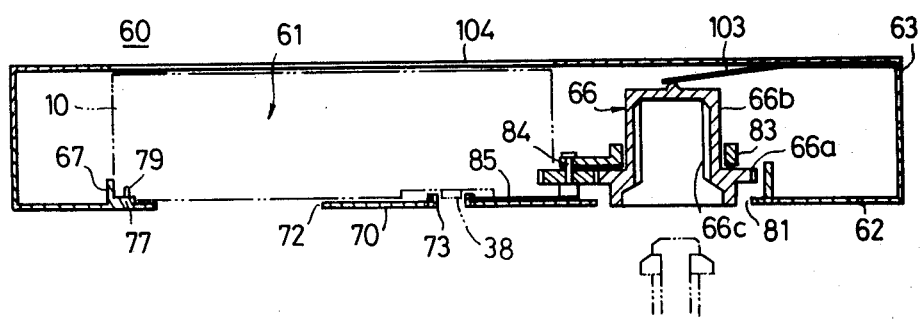
FIG. 13 is a diagram showing the tape cassette adapter shown in FIG. 11 in a vertical cross section.
Figure 12:
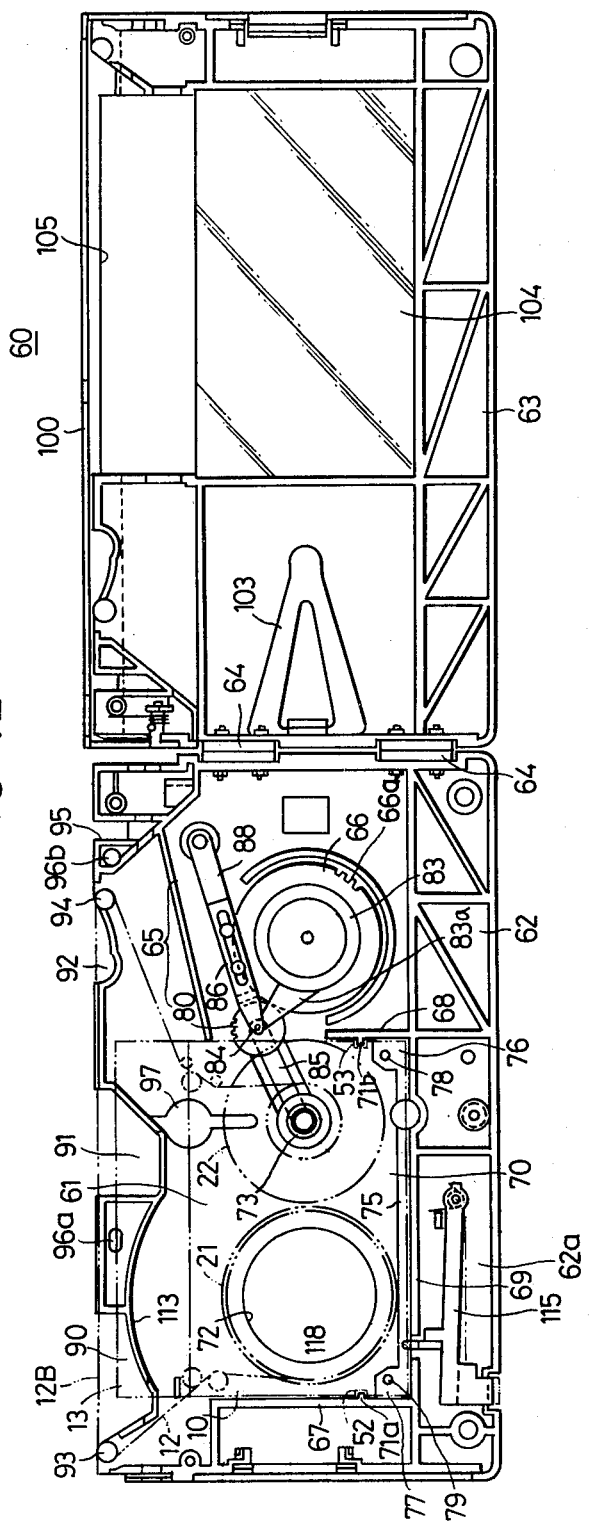
FIG. 12 is a plan view showing the tape cassette adapter shown in FIG. 11 in a state where an upper half is open with respect to a lower half.

FIGS. 11 through 13 show an example of a tape cassette adapter which is used when the miniature type tape cassette 10 having the above described construction is loaded into a standard type recording and/or reproducing apparatus.

A tape cassette adapter 60 has an accommodating part 61 for accommodating the above tape cassette 10, and has an external form and size substantially equal to those of the standard type tape cassette, similarly as in the case of tape cassette adapters which will be described hereinafter. The tape cassette adapter 60 consists of a lower half 62 and an upper half 63, and these halves 62 and 63 are connected at the sides thereof by a hinge 64. The upper half 63 can pivot between an open position indicated in FIG. 12, and a closed position indicated in FIGS. 11 and 13 where the upper half 63 covers the upper surface of the lower half 62.

The above accommodating part 61 for accommodating the tape cassette 10 is formed at a predetermined position of the lower half 62. A rotation transmitting mechanism 65 is provided at a position adjacent to the accommodating part 61. When the lower half 62 is placed on top of the standard type tape cassette for comparison, the supply reel 21 of the tape cassette 10 accommodated within the accommodating part 61 is arranged at a position corresponding to the position of the supply reel of the standard type tape cassette. In addition, a gear structure 66 of a rotation transmitting mechanism 65 is arranged at a position corresponding to the position of the take-up reel of the standard type tape cassette.

The accommodating part 61 has a shape substantially identical to the plane shape of the tape cassette 10 in the plan view, and is a space surrounded by right and left side walls 68 and 67 and a rear wall 69 respectively opposing the right and left sides and the rear of the tape cassette 10 accommodated within the accommodating part 61 and a bottom plate 70 opposing the bottom of the tape cassette 10. Projecting ribs 71a and 71b which respectively fit into the grooves 52 and 53 of the tape cassette 10, are formed on the left and right walls 67 and 68. A circular hole 72 is provided in the bottom plate 70 at a position corresponding to the position of the supply reel of the tape cassette 10 which is accommodated. In addition, a cylindrical member 73 having a penetrating hole is provided on the bottom plate 70 at a position corresponding to the position of the take-up reel of the tape cassette 10 which is accommodated (refer to FIG. 13). Moreover, a long and narrow projecting step part 75 is formed on the bottom plate 70 along the rear wall 69, and projecting step parts 76 and 77 are formed at corner parts between the rear wall 69 and the side walls 67 and 68. Projections 78 and 79 for positioning are respectively provided on the projecting step parts 76 and 77.

The rotation transmitting mechanism 65 consists of the gear structure 66 and an intermediate gear 80 having a small diameter which meshes with the above gear structure 66. As shown in FIG. 13, the gear structure 66 has a gear 66a at the flange part, and a reel driving shaft inserting part 66c within a central projecting part 66b.

A ring-shaped holder 83 is fitted over the periphery of the central projecting part 66b of the gear structure 66 in a rotatable manner. The intermediate gear 80 is provided on a shaft 84 at the tip end of an arm part 83a of the holder 83. Tip ends of a swing arm 85 and a sliding arm 86 are linked together. The base part of the swing arm 85 is fitted and fixed to the outer periphery of the cylindrical member 73.

The sliding arm 86 is linked with an arm 88 which is axially supported by a projecting beam on the lower half 62 at a base part thereof, in a freely slidable manner. Due to this construction, the gear structure 66 is capable of slightly changing the position thereof inside the arcuate wall 82, accompanying the swing of the arm 85 and the sliding of the arm 86.

Similarly as in the standard type tape cassette, cutouts 90 and 91 for inserting loading poles, and a cutout 92 and the like for inserting a capstan, are respectively provided in the front part of the lower half 62. Furthermore, guide poles 93 and 94 are embeddedly provided at the end of the above cutout 90 and at the end of the cutout 92, respectively, in the lower half 62. As will be described hereinafter, the guide poles 93 and 94 guide the magnetic tape 12 so that the magnetic tape 12 forms a tape path 12B along the front surface of the tape cassette adapter 60. Moreover, a cutout 95 for inserting a lid opening lever, openings 96a and 96b for inserting positioning pins, an opening 97 for inserting a light emitting source for detecting the end of the magnetic tape 12, and the like are provided in the lower half 62. In addition, an erroneous erasure preventing lever 115 is assembled within a space 62a at the rear of the tape cassette accommodating part 61 of the lower half 62.

An opening and closing lid 100 is provided at the front surface side of the upper half 63. The lid 100 is of a shape identical to the opening and closing lid of the standard type tape cassette. The lid 100 is supported at the right and left sides, and is constantly urged towards a lid closing direction by the action of a spring.

In addition, a leaf spring 103 is mounted on the upper half 63, to push against the gear structure 66 when the upper half 63 is closed. A transparent plate 104 is adhered onto a part of the upper half 63 which opposes the tape cassette accommodating part 61 when the upper half 63 is closed. Further, a rectangular opening 105 for receiving the lid 13 of the tape cassette 10, is formed in the upper half 63 between the transparent plate 104 and the lid 100.

Figure 14:
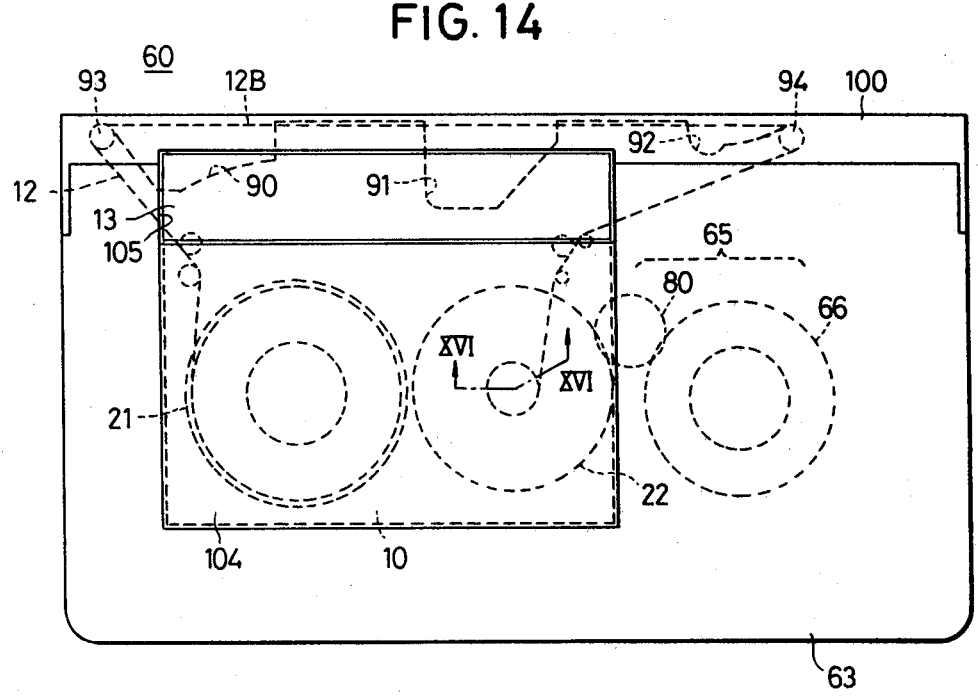
FIG. 14 is a plan view showing a tape cassette adapter in a state accommodating a tape cassette.

Next, description will be given with respect to the manipulation and operation involved in a case where the above described tape cassette 10 loaded to the standard type recording and/or reproducing apparatus together with the tape cassette adapter 60, by referring to FIGS. 14 and 15.

In this case, the tape cassette 10 is accommodated within the tape cassette adapter 60 to form the above described predetermined tape path within the tape cassette adapter 60. This tape cassette adapter 60 accommodating the tape cassette 10 is loaded into the standard type recording and/or reproducing apparatus as in the case where the standard type tape cassette is loaded.

In order to accommodate the tape cassette 10 within the tape cassette adapter 60, the lid 13 of the tape cassette 10 is first opened as shown in FIG. 1. Then, the magnetic tape 12 is drawn out from the tape cassette 10 by a predetermined length. In this state, the magnetic tape 12 can be drawn out from the supply reel 21 or the take-up reel 22 by rotating the supply reel 21 or rotating the take-up reel 22 against the braking force of friction, and it is not necessary to push the supply reel 21 upwards by a finger in order to release the braking effect. In a state before the tape cassette 10 is used, all of the magnetic tape 12 is wound around the supply reel 21 in most cases. Thus, in reality, the supply reel 21 rotates, and the magnetic tape 12 is usually drawn out from the supply reel 21. Even in such a case, the supply reel 21 can rotate smoothly as described above, to allow the tape 12 to be drawn out smoothly. In addition, it is not necessary to hold the lid 13 in the open position by a finger, since the lid 13 is mechanically held at the open position. Hence, the manipulation to draw out the magnetic tape 12 from the above tape cassette 10, and the succeeding manipulation to accommodate the tape cassette 10 within the tape cassette adapter 60, can be performed with ease. In the state where the magnetic tape 12 is drawn out from the tape cassette 10, the tape cassette 10 is accommodated within the accommodating part 61 in the lower half 62, and the magnetic tape 12 which is drawn out is threaded around the guide poles 93 and 94 so as to be guided by these guide poles 93 and 94 as shown in FIG. 12. Accordingly, the magnetic tape 12 is guided by these guide poles 93 and 94, and forms the tape path 12B traversing the front surfaces of the cutouts 90, 91, and 92, as in the case of the standard type tape cassette.

Next, when the tape cassette 10 is accommodated within the accommodating part 61 of the tape cassette adapter 60, the tape cassette 10 is placed on a position where the tape cassette 10 makes contact with the bottom plate 70 facing a predetermined direction, in a state where the grooves 52 and 53 provided on the tape cassette 10 are fitted over the projecting ribs 71a and 71b of the tape cassette adapter 60. Hence, the depressed step part 55 at the bottom surface and depressed step parts 57 and 58 of the tape cassette 10 respectively make contact with the long and narrow projecting step part 75 and the projecting step parts 76 and 77 provided on the bottom plate 70 of the tape cassette adapter 60, and the tape cassette 10 is accordingly positioned with respect to the direction of its height. In addition, a hole 42 and a longitudinal hole 43 provided in the lower half 15 of the tape cassette 10 respectively fit over the projections 78 and 79. Moreover, as shown in FIG. 13, the columnar part of a screw 38 fits into the cylindrical member 73. Accordingly, the tape cassette 10 is accurately positioned since the tape cassette 10 is accurately restricted of its position at three positions.

The teeth 27a of the lower flange 27 which is exposed through the cutout window 41 at the take-up reel 22, mesh with the teeth of the intermediate gear 80 when the tape cassette 10 is lowered.

The pin 78 passes through the hole 42 to push the engaging part 45c. Hence, as indicated by a two-dot chain line in FIG. 10, the pin 78 pushes the braking member 45 upwards against the force exerted by the coil spring 47, that is, towards the axial direction of the take-up reel 22. Therefore, the brake shoe part 45b disengages from the lower flange 27, and the take-up reel 22 is released of the braking operation.

When the upper half 63 is angularly rotated about the hinge 64 and placed on top of the lower half 62 to cover the lower half 62, the upper surface of the tape cassette 10 is pushed by the transparent plate 104 as shown in FIG. 13. Hence, the tape cassette 10 is accommodated within the accommodating part 61 and restricted from moving therefrom. The lid 13 which is in a horizontal state enters within the opening 105.

Figure 15:
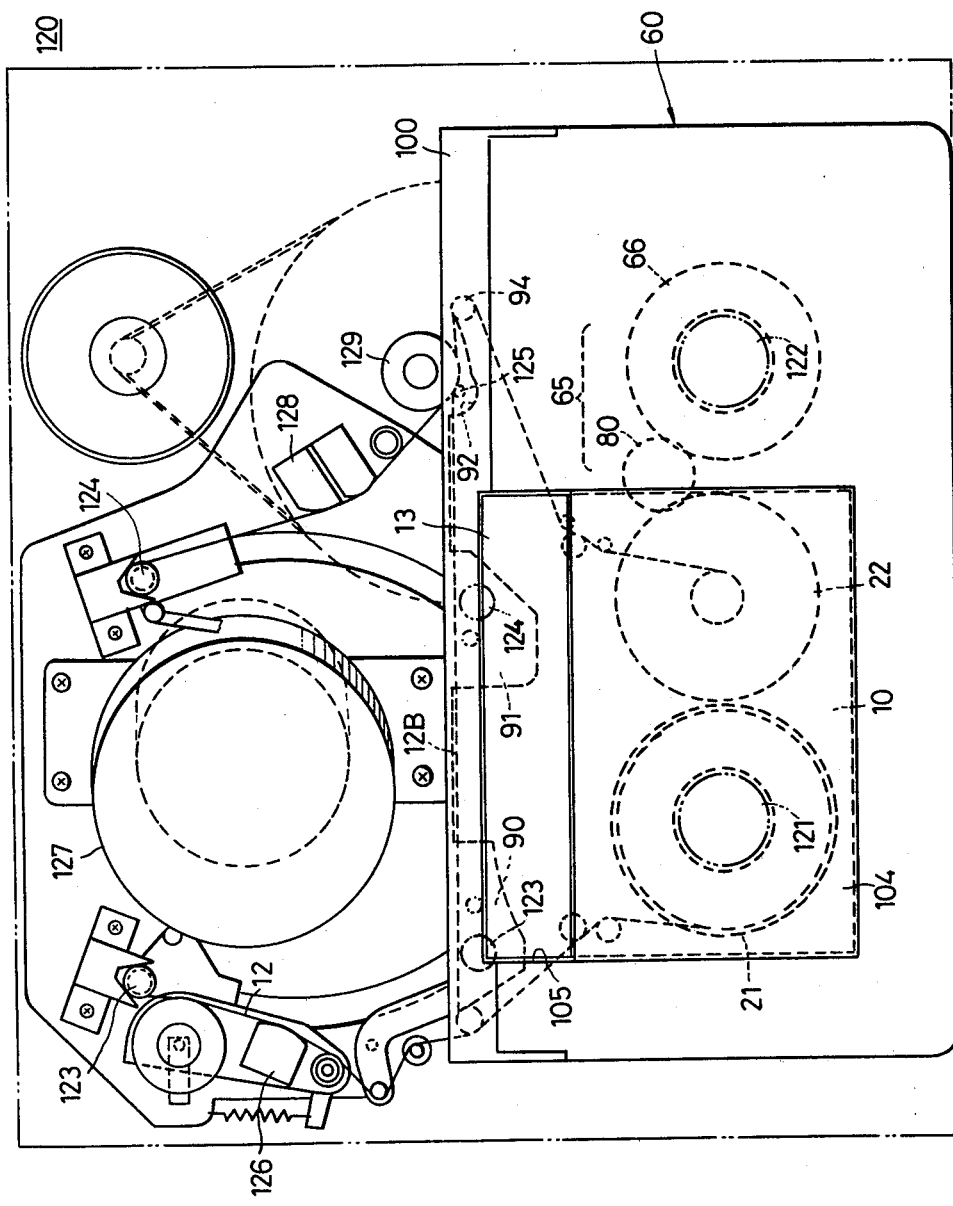
FIG. 15 is a plan view showing an example of a standard type recording and/or reproducing apparatus loaded with a tape cassette adapter which is accommodating a tape cassette, in a recording or reproducing mode.

As shown in FIG. 15, the tape cassette adapter 60 accommodating the tape cassette 10 is loaded into a standard type recording and/or reproducing apparatus 120, similarly as in the case where the standard type tape cassette is loaded.

That is, by loading the tape cassette adapter 60, a supply reel driving shaft 121 is inserted into the reel driving shaft inserting part 25a of the supply reel 21 of the tape cassette 10. On the other hand, a take-up reel driving shaft 122 is inserted into the reel driving shaft inserting part 66c of the gear structure 66 within the tape cassette adapter 60. In addition, loading poles 123 and 124 and a capstan 125 respectively enter into the cutouts 90, 91, and 92 behind a tape path 12B so as to oppose the inner side of the tape path 12B. In addition, in the above loaded state, the supply reel 21 is pushed upwards by the supply reel driving shaft 121 as shown in FIG. 4. Accordingly, the mesh between the teeth 24b and the teeth 34 is completely released, and the supply reel 21 becomes freely rotatable. The take-up reel 22 is released of the braking operation in a state where the tape cassette 10 is accommodated within the tape cassette adapter 60, and is already in a freely rotatable state.

Upon a tape loading operation, the above loading poles 123 and 124 respectively intercept and engage with the magnetic tape 12, then draw the magnetic tape 12 out of the cassette as the loading poles 123 and 124 move away from the cutouts 90 and 91, and reach positions indicated by solid lines in FIG. 17. Accordingly, the magnetic tape 12 which is drawn outside the tape cassette adapter 60, makes contact with a full-width erasing head 126, and makes contact with a guide drum 127 provided with rotary video heads throughout a predetermined angular range. The magnetic tape 12 further makes contact with an audio and control head 128. Therefore, the above magnetic tape 12 is loaded onto a predetermined tape travelling path.

During recording and reproduction, the magnetic tape 12 is driven in a state pinched between the capstan 125 and a pinch roller 129. Moreover, the gear structure 66 within the tape cassette adapter 60 is rotated in the clockwise direction by the take-up reel driving shaft 122. This rotation of the gear structure 66 is transmitted to the take-up reel 22 through the intermediate gear 80, to drive the magnetic tape 12 towards a tape take-up direction. Accordingly, the magnetic tape 12 fed out by the capstan 125 is taken-up by the take-up reel 22. The magnetic tape 12 is guided by the guide pole 94 within the tape cassette adapter 60.

Figure 16:
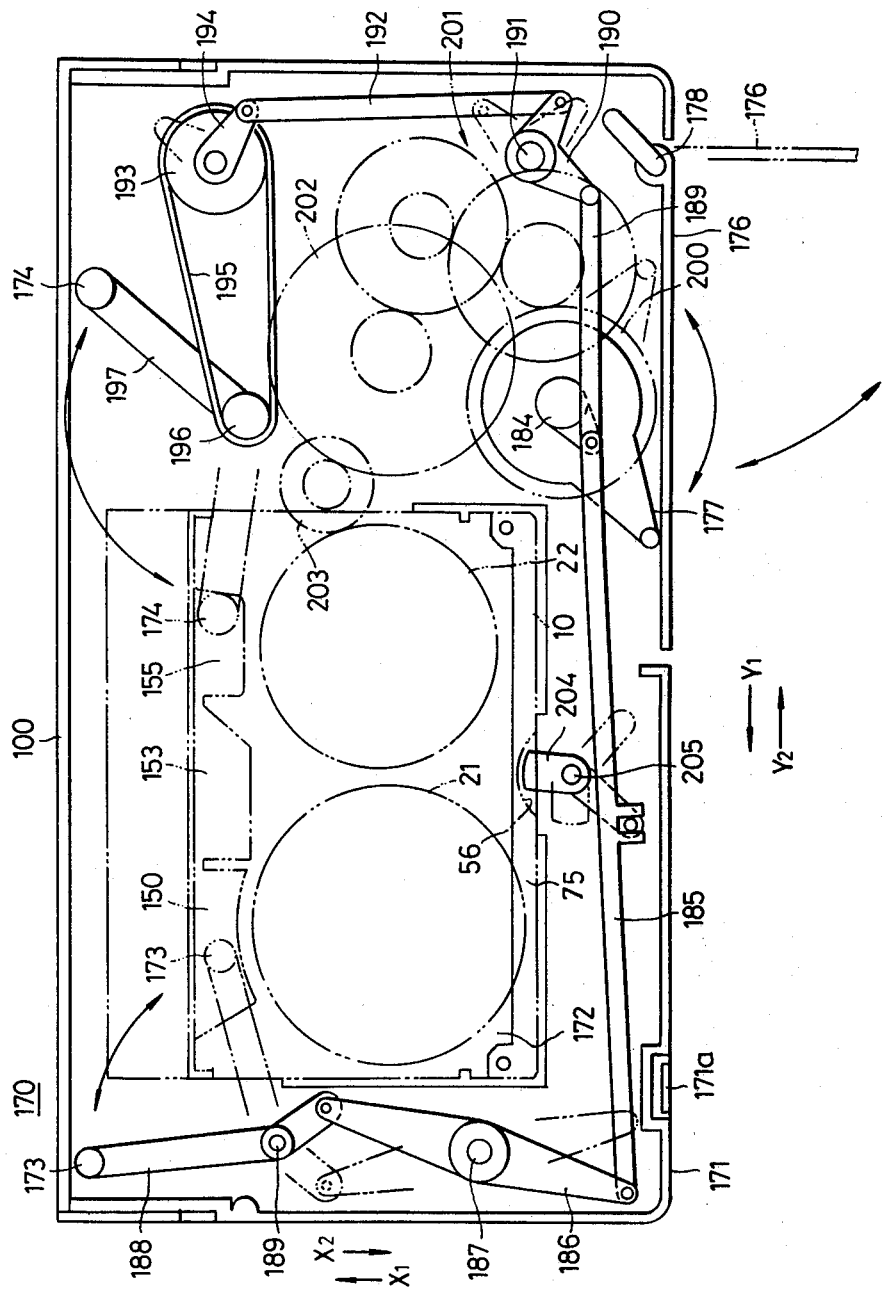
FIG. 16 is a plan view showing a mechanism in a lower half in another example of a tape cassette adapter which is loaded with the tape cassette shown in FIG. 1, in a state where an upper half is removed.

Next, description will be given with respect to another example of a tape cassette adapter, by referring to FIGS. 16 through 20A and 20B. In FIGS. 16 through 18, those parts which are identical to those corresponding parts in FIGS. 11 through 13 are designated by the same reference numerals, and their description will be omitted.

A tape cassette adapter 170 is directed to improve the manipulating efficiency of the tape cassette adapter. That is, the tape cassette adapter 170 is capable of automatically performing the operations to draw out the magnetic tape 12 from the tape cassette 10 and accommodate the magnetic tape 12 within the tape cassette 10, within the tape cassette adapter 170.

The tape cassette 10 is accommodated within an accommodating part 172 of a lower half 171 of the tape cassette adapter 170, in a state where the magnetic tape 12 is not drawn out from the tape cassette 10. By accommodating the tape cassette 10 within the accommodating part 172, guide rollers 173 and 174 are relatively inserted into cutouts 150 and 155 of the tape cassette 10, respectively. After the tape cassette 10 is accommodated within the above accommodating part 172, the lower half 171 of the tape cassette adapter 170 is covered by an upper half 175.

Figure 19:
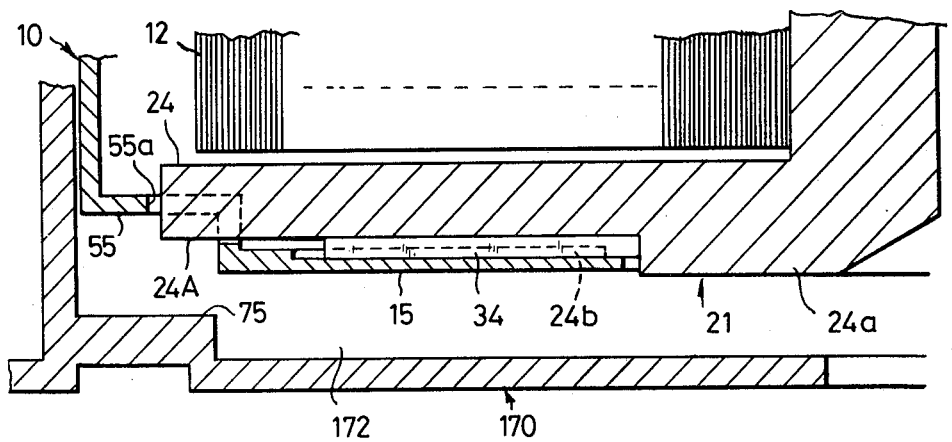
FIG. 19 is a view in cross section showing an essential part of the tape cassette in a state before the tape cassette shown in FIG. 1 is completely loaded into a tape cassette adapter.

When the tape cassette 10 is accommodated within the accommodating part 172 of the adapter 170, in a state before the tape cassette 10 is completely accommodated within the accommodating part 172 as shown in FIG. 19, the crest part of the teeth 24b makes contact with the valley part of the teeth 34 and the teeth 24b and the teeth 34 mesh as shown in FIG. 8 because of the weight of the supply reel 21 itself and the urging force exerted by the leaf spring 35. In this state, a part of the lower flange 24 of the supply reel 21 is exposed through a cutout 55a formed in a part of the depressed step part 55 of the lower half 15, as indicated by a numeral 24A in FIGS. 2C and 19.

Figure 20A:
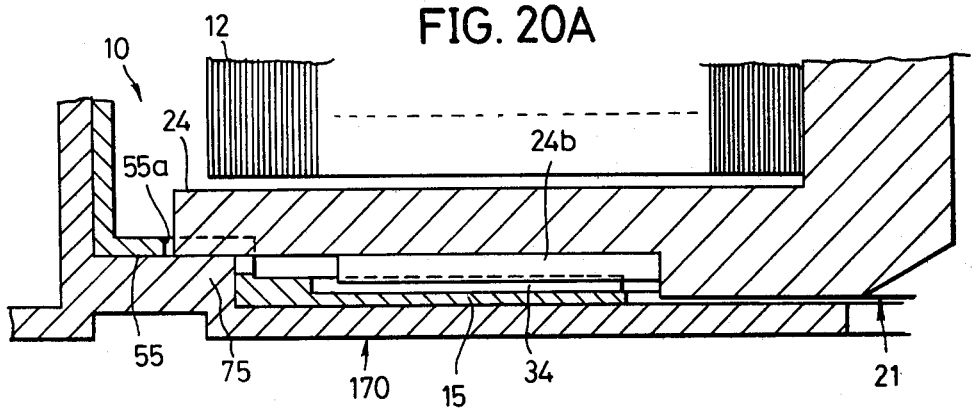
FIGS. 20A and 20B are views in cross section respectively showing an essential part of the tape cassette in a state where the tape cassette shown in FIG. 1 is completely loaded into a tape cassette adapter.
Figure 20B:
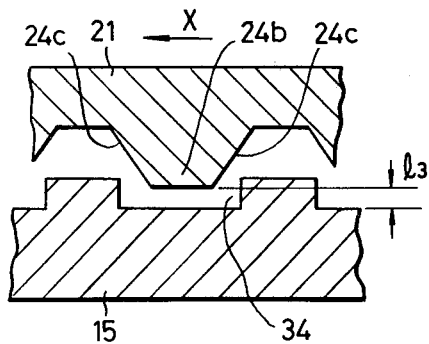

When the tape cassette 10 is completely accommodated within the accommodating part 172 of the adapter 170, the depressed step part 55 of the lower half 15 becomes placed onto the projecting step part 75, as shown in FIG. 20A. In this state, the projecting part 24A of the lower flange 24 in the supply reel 21 is relatively pushed upwards by the projecting step part 75. Thus, the supply reel 21 is put into a slightly floating state inside the cassette case 11. Accordingly, as shown in FIG. 20B, the teeth 24b separate from the teeth 34 by a distance l3 above the teeth 34. Therefore, in this state, although the mesh between the teeth 24b and the teeth 34 is not completely released, the supply reel 21 is in a state where it can easily rotate.

If a lid 176 is opened by rotating the lid 176 about a shaft 178 by an angle of about ninety degrees as shown in FIG. 17, a lever 179 slides towards the direction of an arrow Y1. Moreover, an L-shaped lever 180 rotates towards the clockwise direction about a pin 181, and a lever 182 moves towards the direction of an arrow X1. The tip end of the lever 182 is linked to an arm 183 which is fixed to the shaft 101 of the opening and closing lid 100. By the above described movement of the lever 182, the lid 100 opens as shown in FIG. 18.

In the above state, a lever 177 is rotated towards the clockwise direction about a shaft 184 to a position indicated by a solid line in FIG. 16, from a position indicated by a two-dot chain line in FIG. 16. By this rotation of the lever 177, a connector 185 moves towards the direction of the arrow Y1, and a rotary lever 186 rotates about a shaft 187 towards the clockwise direction. When the above rotary lever 186 rotates, a first loading arm 188 rotates towards the counterclockwise direction about a shaft 189 to a position indicated by the solid line in FIG. 16. In addition, the connector 185 moves towards the direction of the arrow Y1, due to the rotation of the lever 177 in the clockwise direction. Thus, an L-shaped rotary lever 190 rotates in the clockwise direction about a shaft 191, a connector 192 moves towards the direction of an arrow X2, and a gear 193 rotates unitarily with a lever 194 towards the clockwise direction. By the above rotation of the gear 193, a gear 196 is rotated in the clockwise direction through a timing belt 195, and a second loading arm 197 rotates unitarily with the gear 196 towards the clockwise direction.

When the first and second loading arms 188 and 197 rotate as described above, the guide rollers 173 and 174 engage with the magnetic tape 12 to draw the magnetic tape 12 out from the tape cassette 10. At a final stage, the guide rollers 173 and 174 respectively reach positions corresponding to the positions of the guide rollers 93 and 94 of the tape cassette adapter 60 shown in FIG. 12. Accordingly, the magnetic tape 12 is drawn out from the take-up reel 22, and forms a tape path within the tape cassette adapter 170 which is similar to the tape path 12B indicated by the two-dot chain line in FIG. 12. Therefore, the magnetic tape 12 within the tape cassette 10 forms the above tape path without manually handling the magnetic tape 12, and is effective in view of protecting the magnetic tape. As described above, because the mesh between the teeth 24b and 34 is in a slightly released state, the supply reel 21 can rotate with ease to allow the magnetic tape to be drawn out smoothly without subjecting the tape to an excessive force. Similarly as in the above described case, this is especially effective when the take-up reel 22 cannot rotate because there is no more tape wound around the take-up reel 22, and the magnetic tape has to be drawn out solely from the supply reel 21. After the above described operations are performed, the lid 176 is closed as shown in FIG. 16 by rotating the lid 176 in the clockwise direction.

When the tape cassette 10 is extracted from the tape cassette adapter 170, the lid 176 is opened, and the lever 177 is rotated in the counterclockwise direction to the original position indicated by a two-dot chain line in FIG. 16. By rotating the lever 177 in this manner, the loading arms 188 and 197 respectively rotate in the clockwise and counterclockwise directions to the original positions, and the guide rollers 173 and 174 return and enter within the cutouts 150 and 155.

By manipulating the lever 177 in the above described manner, the rotation of a gear 200 which is unitarily provided with the lever 177 is transmitted to a gear structure 202 through a gear mechanism 201. Furthermore, the rotation of the gear 200 is further transmitted to the take-up reel 22 within the tape cassette 10 through a gear 203. Accordingly, the take-up reel 22 rotates in the clockwise direction to take-up the magnetic tape 12 drawn outside the tape cassette 10. Thus, the magnetic tape 12 drawn out of the tape cassette 10 is positively wound with no slack and accommodated within the tape cassette 10, due to the manipulation of the above manipulation lever 177. Therefore, it is not necessary to perform an operation especially for winding the magnetic tape after the lever 177 is manipulated, and the tape cassette 10 can be extracted from the accommodating part 172 immediately. When the tape cassette 10 is extracted, the supply reel 21 moves downwards due to the force exerted by the leaf spring 35, and the teeth 24b and 34 mesh again.

Next, description will be given with respect to a case where the tape cassette 10 is loaded into a compact type recording and/or reproducing apparatus, by referring to FIG. 21.

Figure 21:
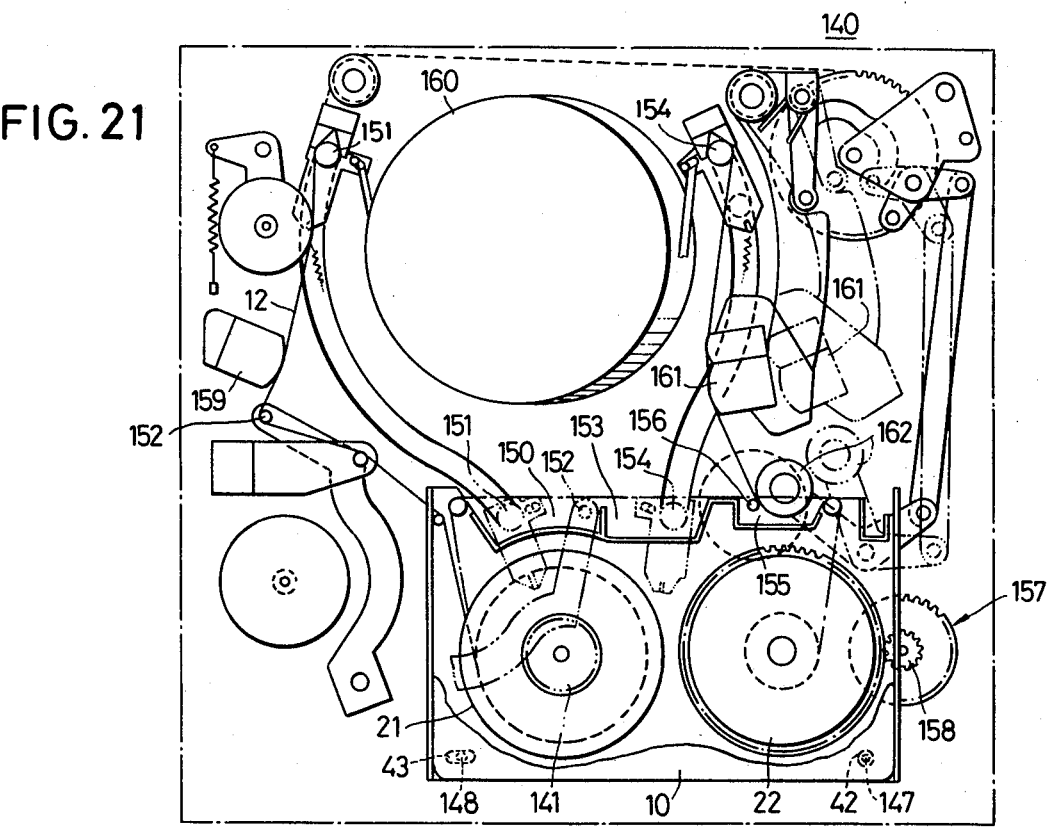
FIG. 21 is a plan view showing an example of a recording and/or reproducing apparatus designed exclusively for the tape cassette according to the present invention which is loaded with the tape cassette shown in FIG. 1, in a recording or reproducing mode.

FIG. 21 shows a compact type recording and/or reproducing apparatus 140. This compact type recording and/or reproducing apparatus 140 is of a smaller size, that is, the width and depth of the compact type recording and/or reproducing apparatus 140 are smaller than those of the standard type recording and/or reproducing apparatus 120 shown in FIG. 15.

A supply reel driving shaft 141 is provided at a cassette loading part of the above compact type recording and/or reproducing apparatus 140, however, a take-up reel driving shaft is not provided. The tape cassette 10 is inserted within a cassette housing having a pop-up mechanism, and then loaded into the cassette loading part by being lowered together with the cassette housing.

When the cassette housing is pushed downwards, the tape cassette 10 is accordingly lowered, and the tape cassette 10 is loaded within the loading part in a state where the central part of the supply reel 21 is inserted with the supply reel driving shaft 141. Moreover, depressed step parts 57 and 58 provided at the bottom of the tape cassette 10 respectively engage with projecting step parts (not shown) provided at the loading part. Further, the tape cassette 10 is positioned by fitting the hole 42 and the longitudinal hole 43 over positioning pins 147 and 148 provided within the apparatus.

During the loading of the above tape cassette 10, a loading pole 151 and a tension pole 152 relatively enter within the cutout 150, while a loading pole 154 and a capstan 156 respectively and relatively enter into cutouts 153 and 155. Furthermore, the lid 13 makes contact with a lid opening projection (not shown) provided in the apparatus, and is relatively opened. In addition, a gear 158 which constitutes a rotation transmitting mechanism 157 on the recording and/or reproducing apparatus, meshes with the teeth on the outer periphery of the lower flange of the take-up reel 22.

In the above loaded state, the supply reel 21 is raised by the reel driving shaft 141 as shown in FIG. 3. Hence, the supply reel 21 becomes freely rotatable when rotationally driven at the center part thereof. Moreover, the braking member 45 is raised by the pin 147 as shown in FIG. 10, and the take-up reel 22 also becomes freely rotatable.

When the operational mode of the recording and/or reproducing apparatus 140 is set to a play mode, the above poles 151, 152, and 154 intercept and engage with the magnetic tape 12 to draw out the magnetic tape 12, and respectively move to positions indicated by solid lines in FIG. 18. Hence, the magnetic tape 12 is drawn out of the tape cassette 10, to make contact with a full-width erasing head 159. The magnetic tape 12 further makes contact with a guide drum 160, which is provided with rotary video heads, throughout a predetermined angular range, and also makes contact with an audio and control head 161. Thus, the magnetic tape 12 is loaded onto a predetermined tape travelling path. During recording and reproduction, the magnetic tape 12 is driven in a state pinched between the capstan 156 and a pinch roller 162. Moreover, the gear 158 which is rotated by a reel driving motor (not shown) meshes with the gear teeth 27a of the take-up reel 22, and the take-up reel 22 is accordingly driven towards a tape take-up direction.

The full-width erasing head 159, the audio control head 161, and the guide drum 160 are constructed under a substantially the same standard as the corresponding heads 126 and 128 and the guide drum 127 of the standard type recording and/or reproducing apparatus 120. Accordingly, a signal is recorded onto and reproduced from the magnetic tape 12 with a tape pattern and format identical to those of the standard type recording and/or reproducing apparatus.

Further, the present invention is not limited to these embodiments, but various variations and modifications may be made without departing from the scope of the present invention.

What is claimed is:

1. A tape cassette for use with a recording and/or reproducing apparatus having a reel driving mechanism including at least one reel driving shaft, said tape cassette comprising a cassette case, a pair of supply and take-up reels provided within said cassette case, for winding a tape, each of said reels at least having a bottom reel flange, a first reel braking mechanism for preventing unnecessary rotation of said supply reel when said tape cassette is not in use, the first reel braking mechanism being released when said reel driving shaft is inserted into said supply reel, and a second reel braking mechanism for preventing unnecessary rotation of said take-up reel when said tape cassette is not in use by applying a braking force on an outer peripheral edge part of the bottom reel flange of said take-up reel, said first reel braking mechanism comprising:
 a first toothed part having crests and valleys, formed on the lower surface of said bottom reel flange of said supply reel; a second toothed part having crests and valleys, formed on a bottom plate of said cassette case at a position opposing the first toothed part of said supply reel; and urging means for urging said supply reel towards the bottom plate of said cassette case so that said first and second toothed parts mesh with each other, the crests of at least one of said first and second toothed parts being formed with a tapered surface on at least one side thereof, said urging means having an urging force such that said supply reel receives a rotational force when tension is introduced in said tape which is to be drawn out, the crests of said first toothed part riding over the crests of said second toothed part against the urging force of said urging means, said second reel braking mechanism comprising a braking member for making contact with and exerting a pushing force against an outer peripheral part at the upper surface of a reel flange of said take-up reel to perform a braking operation with respect to said take-up reel, and means for urging said braking member downwardly, said braking member being displaced upwardly to separate it from the peripheral part of said reel flange and to release the pushing force, in order to release the braking operation with respect to said take-up reel.

2. A tape cassette as claimed in claim 1 in which the crests of said first toothed part are formed with the tapered surface at one side thereof.

3. A tape cassette as claimed in claim 1 in which the crests of said first toothed part are formed with the tapered surfaces on both sides thereof.

4. A tape cassette as claimed in claim 1 in which said tapered surface is a curved surface.

5. A tape cassette as claimed in claim 1 in which the crests of said second teeth part are formed with the tapered surface on one side thereof.

6. A tape cassette as claimed in claim 1 in which the crests of said second teeth part are formed with the tapered surfaces on both sides thereof.

7. A tape cassette as claimed in claim 1 in which the crests of both said first and second toothed parts are formed with the tapered surface.

8. A tape cassette as claimed in claim 1 in which said urging means has an urging force such that, when tension is introduced in said tape to be drawn out said one reel receives a rotational force, the crests of said first toothed part rides over the crests of said second toothed part against the urging force of said urging means.

9. A tape cassette as claimed in claim 1 in which said pair of reels are a supply reel and a take-up reel within said cassette case, said first reel braking mechanism is provided with respect to said supply reel, and said second braking mechanism is provided with respect to said take-up reel.

10. A tape cassette for use with a recording and/or reproducing apparatus having a reel driving mechanism including at least one reel driving shaft, said tape cassette being loaded into said recording and/or reproducing apparatus in a state accommodated within a tape cassette adapter, said adapter having a projecting step part, said tape cassette comprising a cassette case, a reel provided within said cassette case, for winding a tape, a reel braking mechanism for preventing unnecessary rotation of said reel when said tape cassette is not in use, and for releasing the braking when said reel driving shaft is inserted into said reel, a depressed step part for engaging said projecting step part when accommodated within said adapter, and a cutout formed at a part of said depressed step part, for permitting a part of said reel to project therethrough, said reel braking mechanism comprising:

a first toothed part having crests and valleys, formed on the lower surface of said reel; a second toothed part having crests and valleys, formed on a bottom plate of said cassette case at a position opposing the first toothed part of said reel; and urging means for urging said reel towards the bottom plate of said cassette case so that said first and second toothed parts mesh with each other, the crests of at least one of said first and second toothed parts being formed with a tapered surface on at least one side thereof, said part of said reel projecting through said cutout being relatively pushed by said projecting step part to raise reel and weaken the mesh between said first and second toothed parts when said cassette case is accommodated within said adapter.

* * * * *

UNITED STATES PATENT AND TRADEMARK OFFICE
CERTIFICATE OF CORRECTION

PATENT NO. : 4,452,407
DATED : June 5, 1984
INVENTOR(S) : HARUKI OGATA, ET AL.

It is certified that error appears in the above-identified patent and that said Letters Patent is hereby corrected as shown below:

Column 17, Claim 5, line 37, change "teeth" to --toothed--;

Column 17, Claim 6, line 40, change "teeth" to --toothed--.

Signed and Sealed this

Fifteenth Day of January 1985

[SEAL]

Attest:

GERALD J. MOSSINGHOFF

Attesting Officer *Commissioner of Patents and Trademarks*